W. S. GEER.
HARVESTER REEL.
APPLICATION FILED JULY 15, 1915.
1,270,146.
Patented June 18, 1918.
3 SHEETS—SHEET 1.
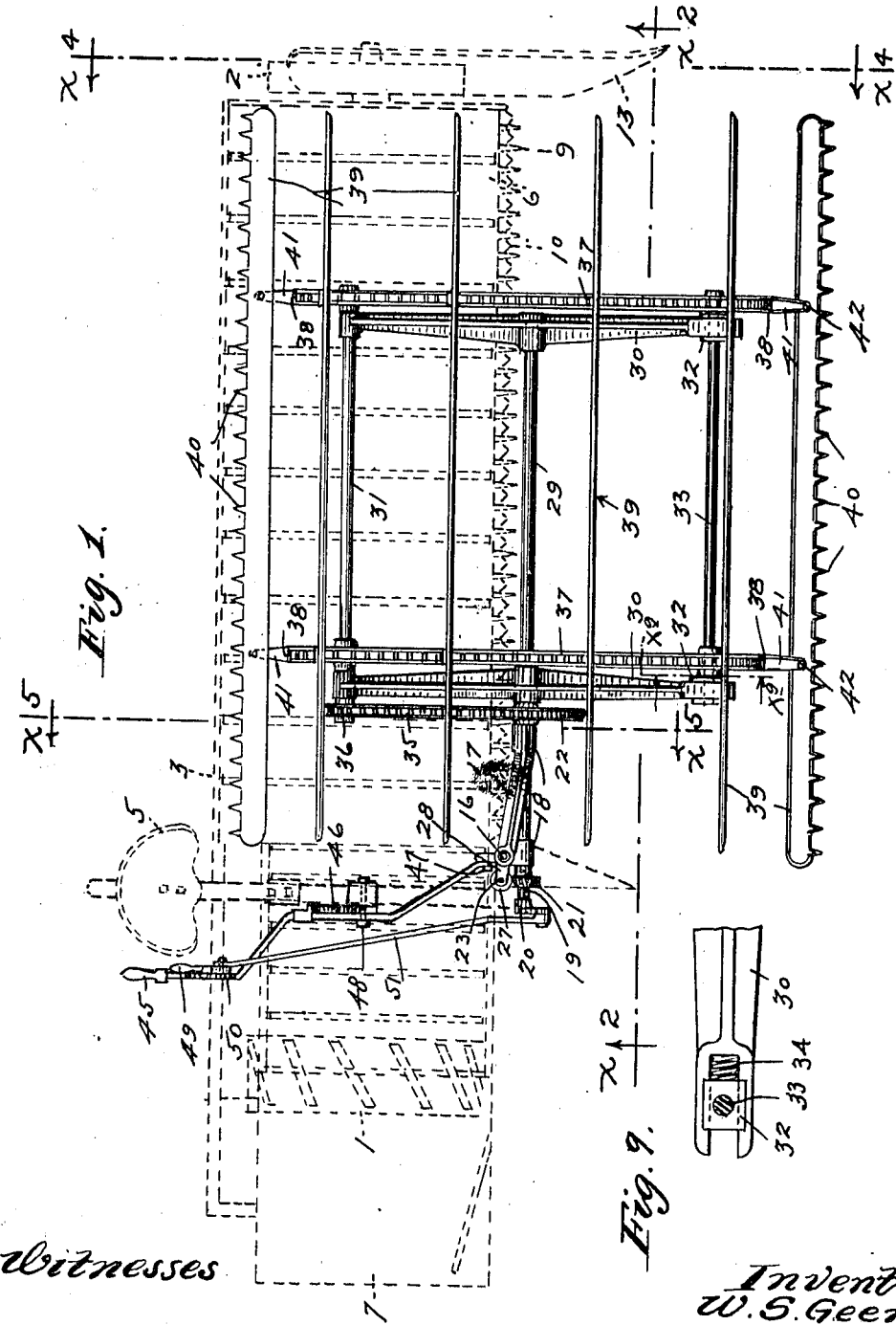
Witnesses
E. C. Skinkle
H. D. Kilgore
Inventor
W. S. Geer
By his Attorneys
Williamson & Michael

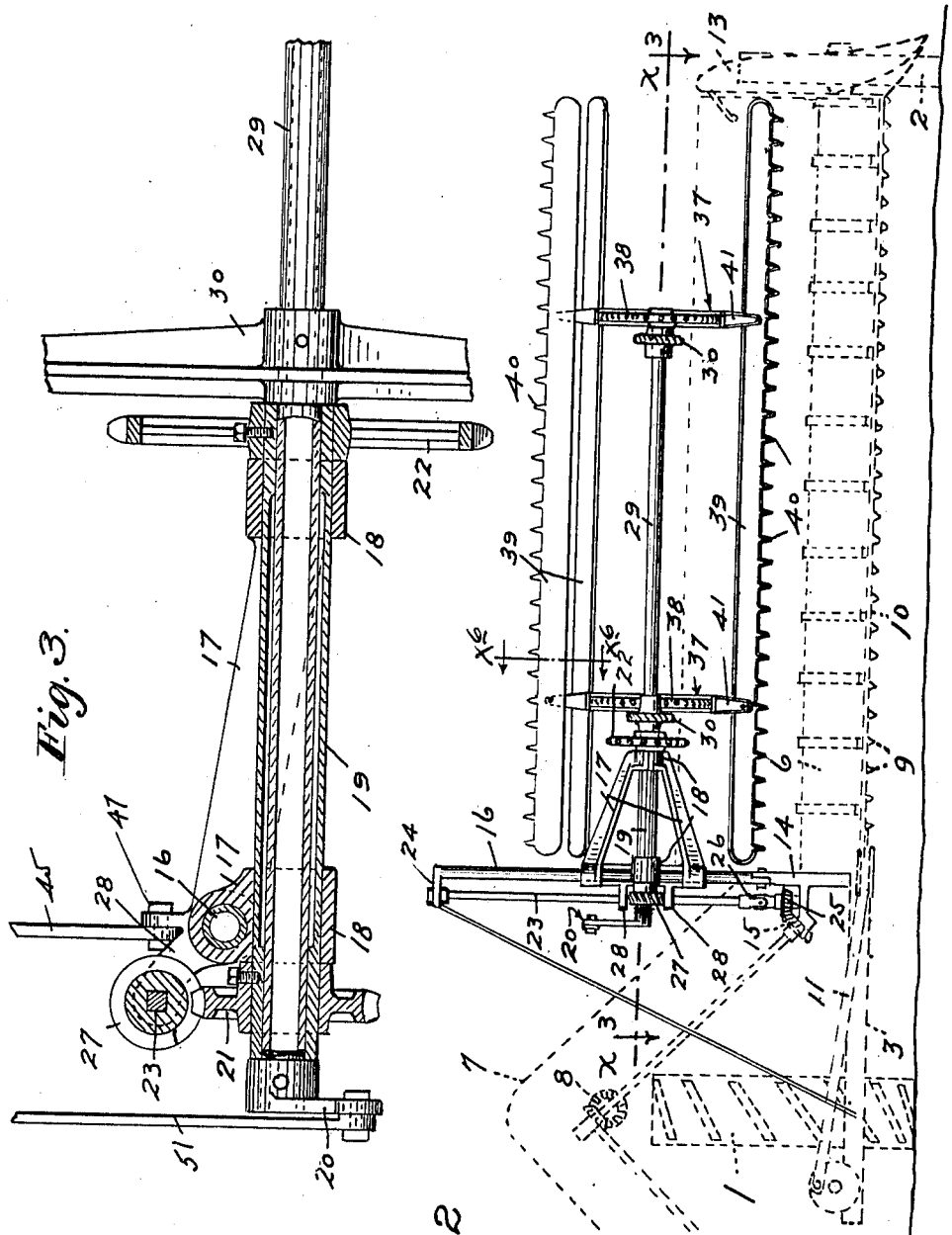

W. S. GEER.
HARVESTER REEL.
APPLICATION FILED JULY 15, 1915.
1,270,146.
Patented June 18, 1918.
3 SHEETS—SHEET 3.
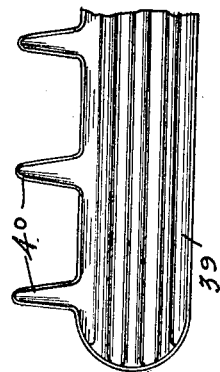
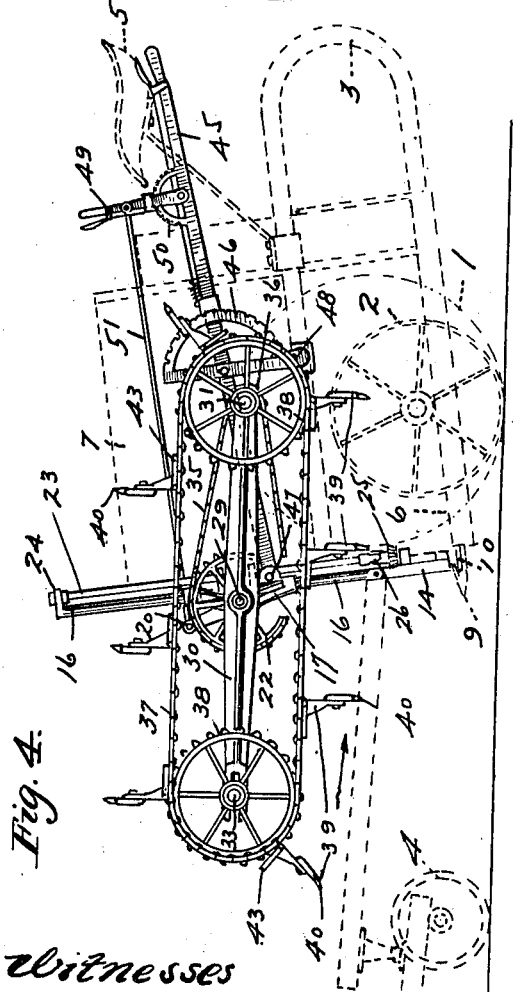
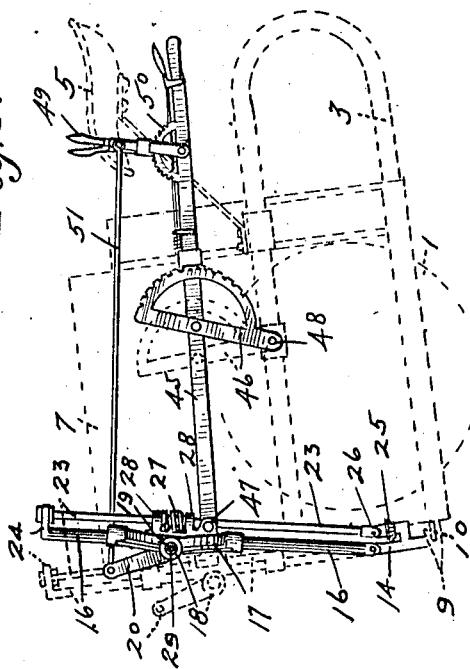
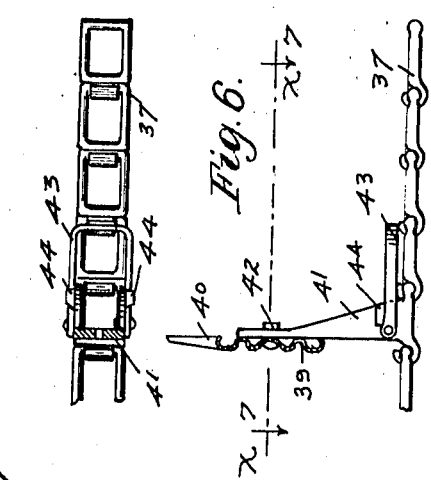
Witnesses
E. C. Skinkle
H. D. Kilgore
Inventor
W. S. Geer
By his Attorneys
Williamson Merchant

UNITED STATES PATENT OFFICE.

WILLIAM S. GEER, OF BURBANK TOWNSHIP, KANDIYOHI COUNTY, MINNESOTA.

HARVESTER-REEL.

1,270,146.        Specification of Letters Patent.     Patented June 18, 1918.

Application filed July 15, 1915. Serial No. 39,973.

*To all whom it may concern:*

Be it known that I, WILLIAM S. GEER, a citizen of the United States, residing at the township of Burbank, in the county of Kandiyohi and State of Minnesota, have invented certain new and useful Improvements in Harvester-Reels; and I do hereby declare the following to be a full, clear, and exact description of the invention, such as will enable others skilled in the art to which it appertains to make and use the same.

My invention relates to improvements in harvester reels; and, to this end, it consists of the novel devices and combinations of devices hereinafter described and defined in the claims.

In the accompanying drawings, which illustrate the invention, like characters indicate like parts throughout the several views.

Referring to the drawings:—

Figure 1 is a plan view of a harvester having incorporated therein the improved reel, said harvester being indicated diagrammatically by means of broken lines;

Fig. 2 is a front elevation of the parts shown in Fig. 1;

Fig. 3 is a fragmentary detail view, with some parts sectioned on the line $x^3$ $x^3$ of Fig. 2, on an enlarged scale;

Fig. 4 is an end view of the grain side of the harvester and reel, as shown in Figs. 1 and 2, some parts being broken away and some parts being removed in the vicinity of the line $x^4$ $x^4$ of Fig. 1;

Fig. 5 is a view, principally in elevation, with some parts sectioned on the line $x^5$ $x^5$ of Fig. 1, and showing certain of the parts, by means of broken lines, in the same position, as shown in Fig. 4, and by means of full lines in different position;

Fig. 6 is a fragmentary detail view, with some parts sectioned on the line $x^6$ $x^6$ of Fig. 2, on an enlarged scale;

Fig. 7 is a plan view of the parts shown in Fig. 6, with some parts removed and some parts sectioned on the line $x^7$ $x^7$ of Fig. 6;

Fig. 8 is a fragmentary detail view of one of the reel blades; and

Fig. 9 is a fragmentary detail view with some parts sectioned on the line $x^9$ $x^9$ of Fig. 1.

Of the parts of the harvester diagrammatically illustrated by means of broken lines, for the purpose of illustrating the invention applied in working position, it is important to note the bull wheel 1, grain wheel 2, frame 3, steering truck 4, seat 5, platform 6, elevator 7, bevel gear 8 on the driving connection for the elevator 7, guard fingers 9, sickle bar 10, driving connections 11 for the sickle bar, and grain board 13. It is also important to note the bearing bracket 14 on the frame 3, on which the ordinary reel is supported, and the driving connections from the bevel gear 8, including a bevel gear 15, for driving an ordinary reel. The parts thus far described may be of the standard or any desired construction.

Referring now in detail to the improved harvester reel, the numeral 16 indicates an upright shaft having its lower end pivoted to the bearing bracket 14 for swinging movement in the direction of travel of the harvester. Mounted for sliding movement on the shaft 16 is a bearing bracket 17, having a pair of axially alined bearing hubs 18, in which is journaled a relatively short tubular driving shaft 19. This shaft 19 projects horizontally from the upright shaft 16, substantially vertically above the sickle bar 10 and slightly beyond each of the hubs 18. Rigidly secured to the end of the shaft 19, adjacent to the shaft 16, is a crank arm 20. Also, rigidly secured to the driving shaft 19, between the shaft 16 and the crank arm 20, is a worm wheel 21. On the other end of the driving shaft 19 is rigidly secured a relatively large sprocket wheel 22.

A square shaft 23 extends parallel to the upright shaft 16 and is journaled, at its upper end, in a bearing 24, formed by extending the upper end of the shaft 16 laterally. The lower end of the shaft 23 is connected to a bevel gear 25 by a universal joint 26. The bevel gear 25 is journaled in a lateral extension of the bearing bracket 14 and meshes with the bevel gear 15. Slidably mounted on the shaft 23 is a worm 27, which meshes with the worm wheel 21 and is held for rotation with the shaft 23.

The worm 27 is held against endwise movement with respect to the bearing bracket 17 by a pair of vertically spaced extensions 28 on the said bearing bracket 16 and through which extensions the shaft 23 extends. These bracket extensions 28 also perform another important function, and that is they hold the bearing bracket 17 and hence, the driving shaft 19 against horizontal swinging movement. From the above description, it is evident that the driving shaft 19 of the improved harvester reel is, in turn, driven from the elevator 7, through part of the driving connections for an ordinary reel, including the bevel gear 15, and through the bevel gear 25, shaft 23, worm 27, and worm wheel 21.

One end of the oscillatory shaft 29 is journaled in the driving shaft 19 and the other end portion thereof extends outward over the sickle bar 10. To this oscillatory shaft 29 is keyed, at their intermediate portions, a pair of horizontally extended frame bars 30, having journaled on their rear end portions a driven shaft 31. Obviously, the shaft 29 and side bars 30 constitute a frame for the improved reel. The forward ends of the frame bars 30 are bifurcated and have mounted therein sliding bearings 32, in which is journaled an idle shaft 33. Both shafts 31 and 33 extend parallel to the oscillatory shaft 29. Chain tighteners 34, in the form of coiled springs, are compressed between the sliding bearings 32 and the transverse portions of the bifurcated ends of the frame bars 30.

The shaft 31 is driven from the driving shaft 19 by a sprocket chain 35, which runs over the sprocket wheel 22 and a relatively small sprocket wheel 36 keyed to said shaft 31. A pair of laterally spaced sprocket chains 37 run over pairs of alined sprocket wheels 38, keyed to the shafts 31 and 33. There is one pair of alined sprocket wheels 38 located on the grain side of each frame bar 30. A plurality of reel blades 39 are carried by the sprocket chains 37. As shown, these reel blades 39 are formed from sheet metal with longitudinally spaced teeth 40 formed on their outer edges. The bodies of the reel blades 39 and their teeth 40 are corrugated and flanged to stiffen and give the reel blades the necessary strength. The reel blades 39 are secured to the sprocket chains 37 by arms 41 formed on certain of the links of said sprocket chains. The arms 41 extend laterally outward from the sprocket chains 37 and the reel blades 39 are secured to the free end portions thereof by nut-equipped bolts 42.

To give stability to the arms 41 and reduce the movements thereof, longitudinally of the sprocket chains 37, each thereof is provided with a U-shaped foot 43. The prongs of each foot are pivotally connected to the respective arm 41 and extend rearward therefrom, parallel to the respective sprocket chain 37, and the transverse portion of said foot rests on said chain 37, as best shown in Figs. 6 and 7. Lugs 44, on the arms 41, engage the prongs of the feet 43 to prevent lifting movement thereof. The purpose of pivotally connecting the feet 43 to the arms 41 is to permit the assembly of the links of the sprocket chains 37 with the links of the arms 41.

The improved harvester reel is raised and lowered on the shaft 16 and moved forward and backward in respect to the direction of the travel of the harvester, by a latch-equipped primary hand lever 45 and a co-operating lock segment 46. The latch lever 45 extends horizontally and rearwardly and is intermediately fulcrumed to the segment 46, at the axis thereof, and its forward end is pivotally connected at 47 to the bearing bracket 17. The lock segment 46 extends in a vertical plane and is pivoted at 48 to the frame 3 for oscillatory movement in a vertical plane, in the direction of the travel of the harvester. Obviously, when the primary lever 45 is locked to the lock segment 46, the shaft 16 is rigidly locked against pivotal movement. By changing the interlocking engagement of the primary lever 45 with the lock segment 46, the shaft 16 may be set in different oblique positions; and hence, the improved harvester reel may be moved bodily, either forward or backward, in respect to the direction of the travel of the harvester. Or, by releasing the primary lever 45 from the lock segment 46, and then moving the free end of the said lever, either downward or upward, the reel may be raised or lowered bodily.

Oscillatory movement is imparted to the shaft 29, for the purpose of changing the horizontal inclination of the reel by a secondary latch-equipped hand lever 49 and co-operating segment 50. The secondary lever 49 extends vertically upward from the primary lever 45 and its lower end is fulcrumed thereon. The segment 50 is integrally formed with the primary lever 45. A relatively long link 51 affords a connection between the intermediate portion of the secondary lever 49 and the crank arm 20.

Operation.

The operation of the improved harvester reel may be briefly stated as follows:—

Continuous traveling movement is imparted to the reel blades 39 from the bevel gear 15 of the harvester through the several connections, previously identified. The reel blades 39, during their lower or operative run, move in substantially a horizontal plane in the direction of the arrow marked on Fig. 4. By actuating the secondary lever 49 to oscillate the frame bars 30, the inclination of the traveling movement of the operative run of the reel blades 39 may be changed, at will. Or, by setting the primary lever 45 in different adjustments on the lock segment 46, the improved harvester reel may be advanced or set back bodily. In case it is desired to elevate the reel bodily, for the purpose of clearing a stone, stump, or other obstruction, the primary lever 45 is released from the lock segment 46 and its free end forced downward, thereby sliding the bearing bracket 17 upward on the shaft 16, which action raises the reel bodily. The reel may be held in this elevated position, until the obstruction is passed, and then return to its original position. Obviously, during this raising and lowering movement of the reel bodily, the inclination of the reel is not thrown out of adjustment, when the reel assumes its original position, for the reason that the secondary lever 49 is carried by the primary lever 45.

The horizontal traveling movement of the reel blades 39 prevent throwing the grain back and over the platform 6, or depositing the same on the rear of the platform. The improved reel will also pick up fallen and tangled grain and will not thresh, because it runs much slower than an ordinary reel with few blades. The improved reel, also, has a steady motion and does not have a beating action, as in an ordinary reel.

What I claim is:—

1. A harvester reel, and means supporting the reel for compound vertical and horizontal adjustments, said means including a pivoted lock segment, a lever fulcrumed on the lock segment and a latch for securing the lever to the lock segment, whereby the lever may be held in different adjustments and the lock segment against pivotal movement.

2. A harvester reel, and means supporting the reel for compound vertical and horizontal adjustments, said means including a pivoted lock segment, a lever fulcrumed at the center of the lock segment and a latch for securing the lever to the lock segment, whereby the lever may be held in different adjustments and the lock segment against pivotal movement.

3. A harvester reel including a frame and traveling blades, and means supporting the reel frame for compound vertical and horizontal adjustments and for oscillation in a vertical plane, said means including a pivoted primary lock segment, a primary lever fulcrumed on the lock segment, a latch for securing the lever to the lock segment and a secondary lever and coöperating lock segment carried by the primary lever.

4. A harvester reel including a frame and traveling blades, and means supporting the reel frame for compound vertical and horizontal adjustments and for oscillation in a vertical plane, said means including a pivoted primary lock segment, a primary lever pivoted to the reel frame and fulcrumed on the primary lock segment, a latch for securing the primary lever to the primary lock segment, a secondary lever and coöperating lock segment carried by the primary lever and a link connection between the secondary lever and reel frame.

5. Reel mechanism for harvesters comprising a frame mounted for bodily vertical and horizontal movements and for oscillatory movement in a vertical plane, blades mounted on the frame for substantially horizontal operative traveling movement, a primary lock segment pivotally mounted for vertical swinging movement, a primary lever fulcrumed at the center of the primary lock segment for imparting said vertical and horizontal movements to the frame, a secondary lock segment carried by the primary lever, and a secondary lever fulcrumed at the center of the secondary lock segment for imparting said oscillatory movement to the frame, said two levers having latches coöperating with the respective lock segments.

6. Reel mechanism for harvesters comprising an upright shaft mounted for swinging movement in the direction of travel of the harvester of which the reel mechanism is a part, a frame mounted on said shaft for raising and lowering movement and for oscillatory movement in a vertical plane, wheels journaled on said frame, belts arranged to run over said wheels, a plurality of laterally spaced reel blades carried by said belts, means for driving said belts, a primary lock segment pivotally mounted for vertical swinging movement, a primary lever fulcrumed at the center of said primary lock segment for raising and lowering said frame bodily and arranged to be locked to said lock segment for holding said shaft in different oblique positions, a secondary lock segment carried by said primary lever, and a secondary lever fulcrumed at the center of said secondary lock segment for imparting oscillatory movement to the frame and arranged to be locked to said secondary lock segment for holding said frame in different oscillated positions.

In testimony whereof I affix my signature in presence of two witnesses.

WILLIAM S. GEER.

Witnesses:
S. L. BENTON,
ELLA SWENSON.